United States Patent
Baxter et al.

[15] 3,700,222
[45] Oct. 24, 1972

[54] PIPE SLITTING MACHINE

[72] Inventors: Calvin J. Baxter, Springville; McKinley B. Thomas, both of Orem, Utah

[73] Assignee: United States Steel Corporation

[22] Filed: May 13, 1971

[21] Appl. No.: 142,871

[52] U.S. Cl.................266/23 K, 266/23 N, 269/56, 269/58
[51] Int. Cl. .............................................B23k 7/04
[58] Field of Search......266/23 N, 23 K, 23 M, 23 R; 269/56, 58

[56] References Cited

UNITED STATES PATENTS

| | | | |
|---|---|---|---|
| 2,221,788 | 11/1940 | Doyle | 266/23 N X |
| 2,317,239 | 4/1943 | Yoch | 266/23 N |
| 2,426,690 | 9/1947 | Hughey | 266/23 R |
| 2,884,242 | 4/1959 | Fleming | 269/58 X |

Primary Examiner—Frank T. Yost
Attorney—Martin J. Carroll

[57] ABSTRACT

Apparatus for cutting a relatively short section of pipe into a plurality of arcuate segments includes a cradle having a support for receiving the pipe with its axis generally horizontal when the cradle is in its lower position and a plate normal to the support at one end of the support. The cradle is pivotally mounted about a horizontal axis and is rotated upwardly through an angle of 90° so that the pipe rests on the plate with its axis vertical. A vertically movable carriage surrounds the pipe when in its upper position and carries a plurality of cutting torches. Means are provided to move the carriage from the bottom of the pipe to the top with the torches in operation to divide the pipe into a plurality of segments. The cradle is then rotated in the same direction as the original rotation to discharge the segments from the cradle after which the cradle is returned to its original position. Special means are provided for moving the cradle.

9 Claims, 9 Drawing Figures

PATENTED OCT 24 1972

INVENTORS.
CALVIN J. BAXTER &
McKINLEY B. THOMAS
By Martin J. Carroll
Attorney

INVENTORS.
CALVIN J. BAXTER &
McKINLEY B. THOMAS
By Martin J. Carroll
Attorney

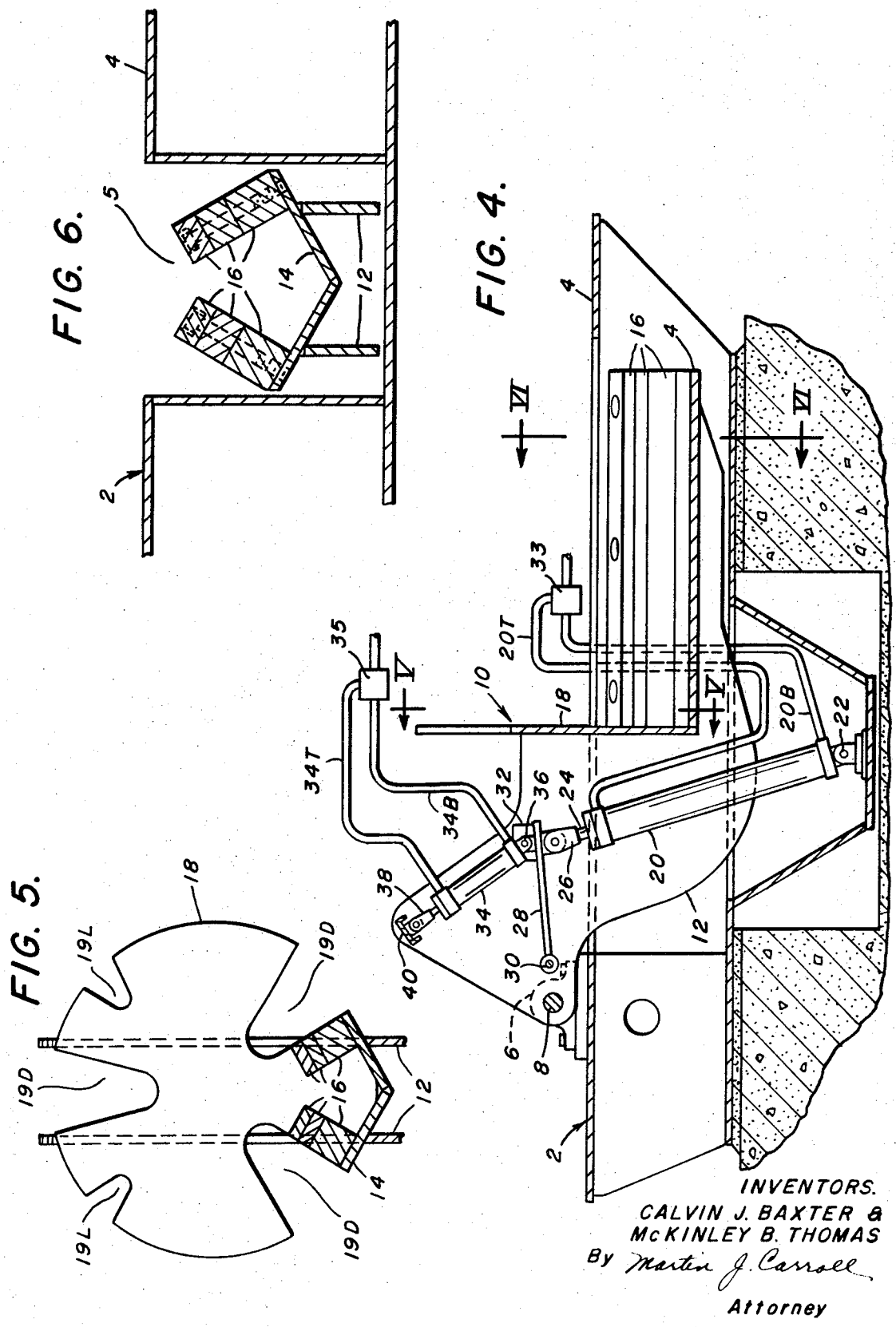

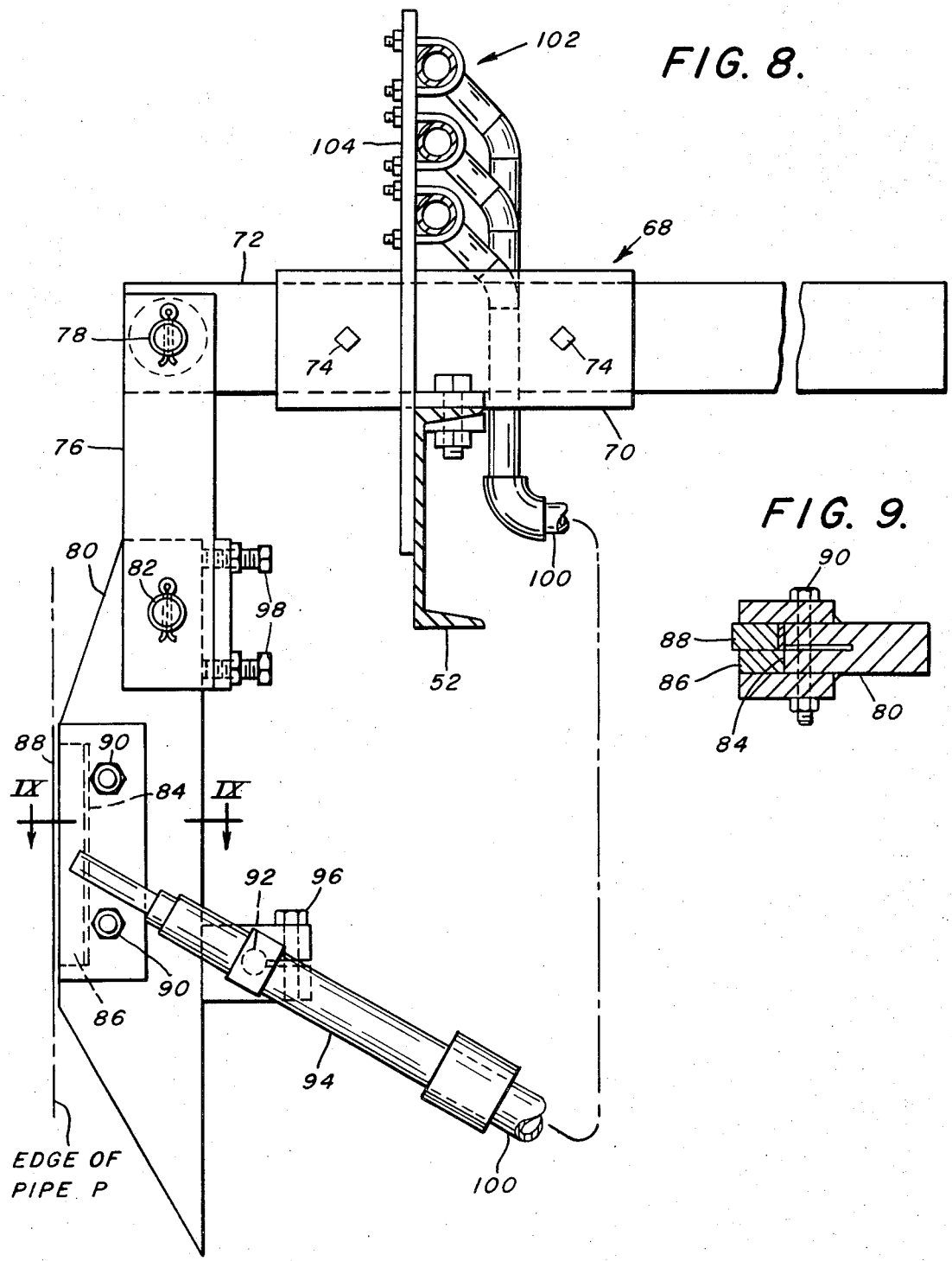

PIPE SLITTING MACHINE

This invention relates to apparatus for slitting or cutting a pipe into a plurality of segments and is especially adapted for cutting large pipes having a diameter between 20 to 40 inches into three or four segments. These pieces of pipe are cut from the ends of the originally formed pipe to eliminate defects in the end and are therefore scrap products. The scrap pipe is charged into an open hearth or oxygen steelmaking furnace as part of the charge. However, they cannot be charged in their cylindrical condition. Prior to our invention the pipe was cut into segments by hand labor using oxy-acetylene torches. This is a time consuming and hence an expensive operation.

It is, therefore, an object of our invention to provide a pipe slitting machine which will cut the rejected ends of large diameter pipes into segments suitable for loading into charging boxes for subsequent charging into steelmaking furnaces.

Another object is to provide such a machine which may be used to cut pipes of various diameters.

These and other objects will be more apparent after referring to the following specification and attached drawings, in which:

FIG. 4 is an enlarged view of a portion of FIG. 2;

FIG. 5 is a view taken on the line V—V of FIG. 4;

FIG. 6 is a view taken on the line VI—VI of FIG. 4;

FIG. 8 is a view taken on the line VIII—VIII of FIG. 3; and

FIG. 9 is a view taken on the line IX—IX of FIG. 8.

Figure 1:
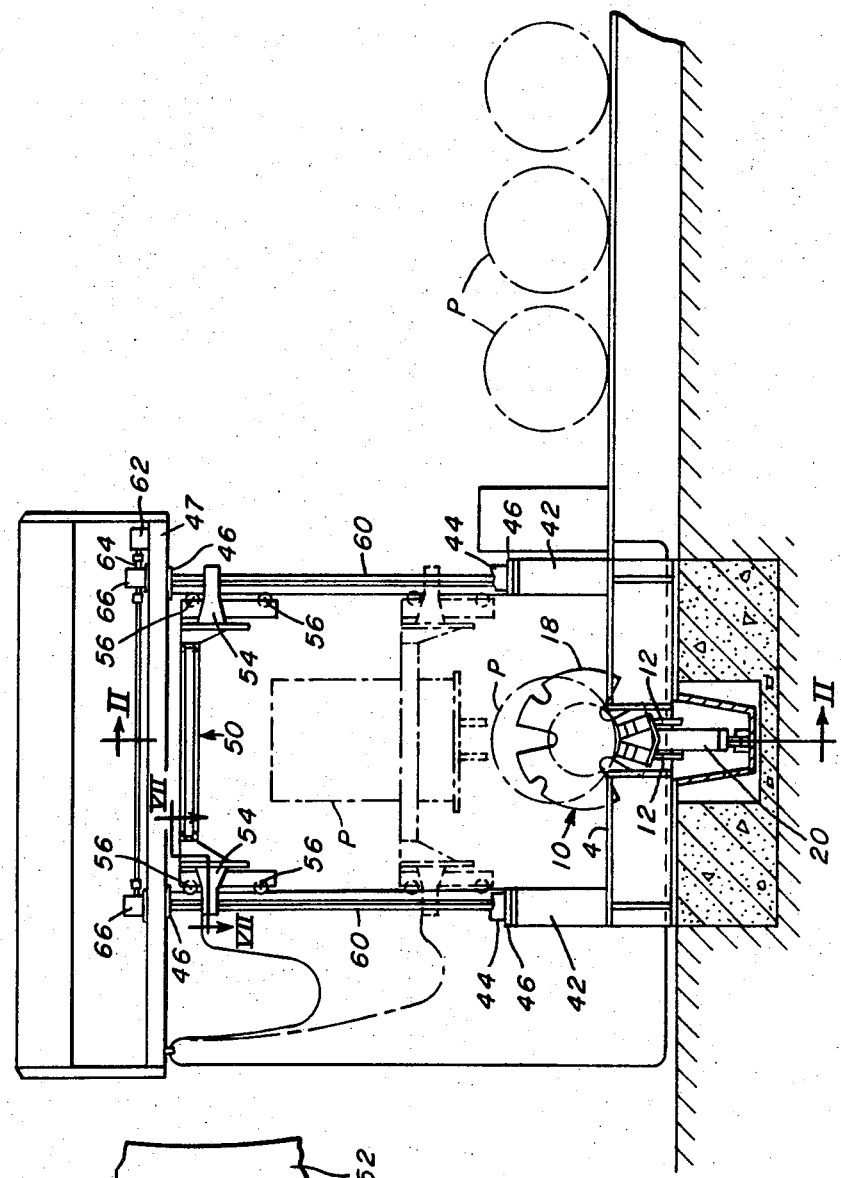
FIG. 1 is a side elevation of the pipe slitting machine of our invention.

Referring more particularly to the drawings, reference numeral 2 indicates a base frame which includes a floor 4 having an opening 5 therein. Mounted on the frame 2 are a pair of spaced bearings 6 for rotatably supporting a shaft 8 which is fixed to a cradle 10. The cradle 10 includes a pair of spaced apart plates 12. An angle 14 extends between and is welded to the plates 12. A plurality of bars 16 are mounted on each leg of the angle 14 so as to provide a support for receiving a pipe P. The number of bars 16 may be varied to provide for pipes of various diameter. A plate 18 also extends between the plates 12 and is welded thereto and also to one end of angle 14. As best seen in FIG. 5, the plate 18 has a plurality of cut out portions 19 around its periphery for a purpose that will appear later. Five such cut out portions are shown with three 19D being of greater depth than the other two 19L. However, it will be understood that the number may vary and that all of the cut out portions may be of the same depth, depending upon the size of pipe and number of cuts to be made. An hydraulic cylinder 20 has its lower end pivotally mounted on frame 2 by means of a pin 22. Piston rod 24 has its outer end secured by means of a pin and clevis 26 to a plate 28 which extends between the plates 12 and is pivotally mounted on a pin 30 which extends between and is secured to the plates 12. A stop 32 is welded to the inside of each plate 12 to limit the upward movement of plate 28. Fluid under pressure is introduced into the bottom of cylinder 20 through a flexible hose 20B and to its top through hose 20T. Flow of fluid to the cylinder 20 is controlled by means of four-way valve 33. A second hydraulic cylinder 34 has its lower end pivotally mounted on pin 36 secured to plate 28 and its piston rod 38 pivotally attached to a channel 40 which extends between and is welded to the plates 12. Fluid under pressure is introduced into the bottom of cylinder 34 through a flexible hose 34B and to its top through hose 34T. Flow of fluid to cylinder 34 is controlled by means of a four-way valve 35.

Figure 7:
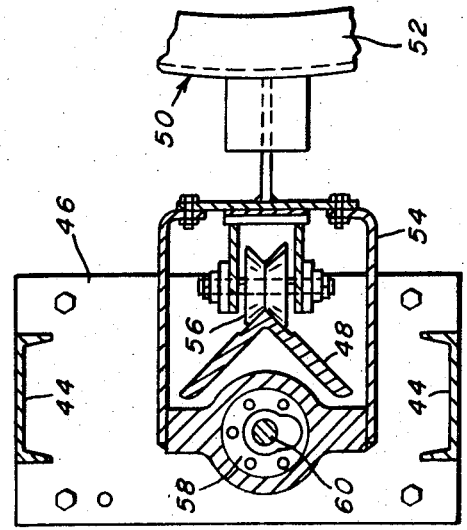
FIG. 7 is a view taken on the line VII—VII of FIG. 1.

Extending upwardly from the base frame 2 are two support frames 42, each including two vertical beams 44 connected at their tops and bottoms by means of horizontal plates 46. The bottom plate 46 is bolted to the base frame 2. The top plate 46 is bolted to a top beam 47. An angle 48 is welded to the top and bottom plates 46 between each pair of vertical beams 44, the angle forming a vertical track for a torch carriage 50. The carriage 50 includes a horizontal ring 52 which has an extension 53 midway between the frames 42 to provide clearance for cradle 10. A roller bracket 54, best shown in FIG. 7, is attached to ring 52 adjacent to each angle 48. Each bracket 54 rotatably supports upper and lower grooved rolls 56 which ride on the associated angle 48. A nut 58 is secured to each bracket 54 between each pair of beams 44. A vertical rotatable screw 60 is mounted between each pair of end beams 44 and passes through the associated nut 58. The screws 60 are rotated in unison by means of a variable-speed reversible D.C. motor 62 which rotates A shaft 64 connected to drive a pair of gear boxes 66, one connected to each screw 60.

Figure 3:
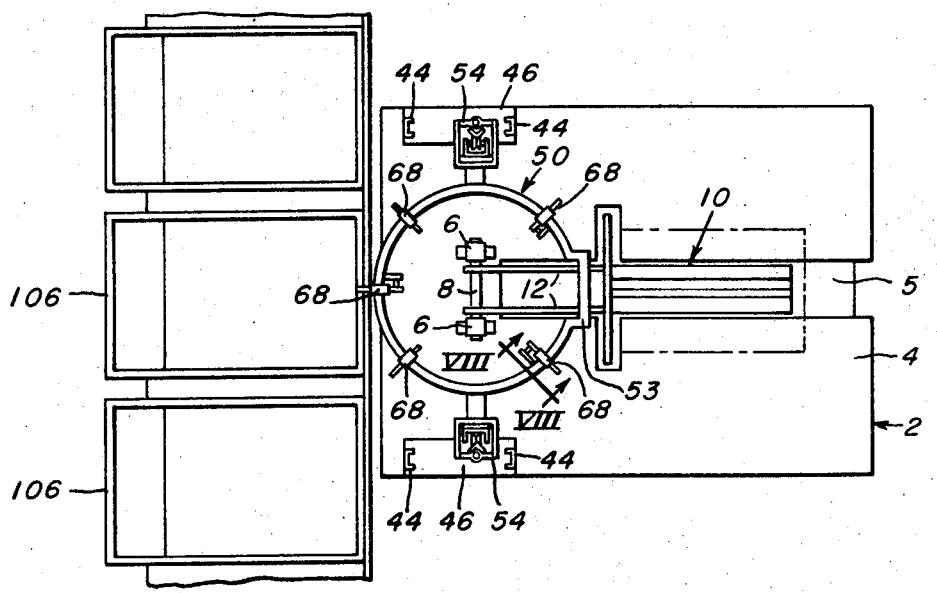
FIG. 3 is a top plan view of FIG. 2.

Spaced apart around the periphery of the ring 52 (FIG. 3) are a plurality of torch holders 68. Each torch holder (FIG. 8) includes a sleeve 70 secured to ring 52 for slidably receiving a horizontal arm 72 which is held in adjusted position by means of set screws 74. A link 76 is pivotally attached to arm 72 by means of a pin 78. A bracket or holder 80 is pivotally attached to the bottom of link 76 by means of a pin 82. The inner part of the bracket 80 includes a slot 84 for receiving a permanent magnet 86 and a wear plate 88 which extends inwardly beyond the magnet 86. The magnet 86 and wear plate 88 are clamped in place by means of bolts 90. The outer end of the bracket 80 has a horizontal hole 92 therethrough for pivotally receiving a cutting torch 94 which is clamped in adjusted position by means of a bolt 96. The bracket 80 is held by means of cap screws 98 in such a position that the face of magnet 86 and plate 88 will be substantially vertical. Each torch 94 has its hoses 100 connected to circular manifolds 102 supported on ring 52 by means of plates 104. A scrap bucket 106 is mounted on a scrap car 108 which is movable on rails 110 on the side of base frame 2 opposite opening 5.

Figure 2:
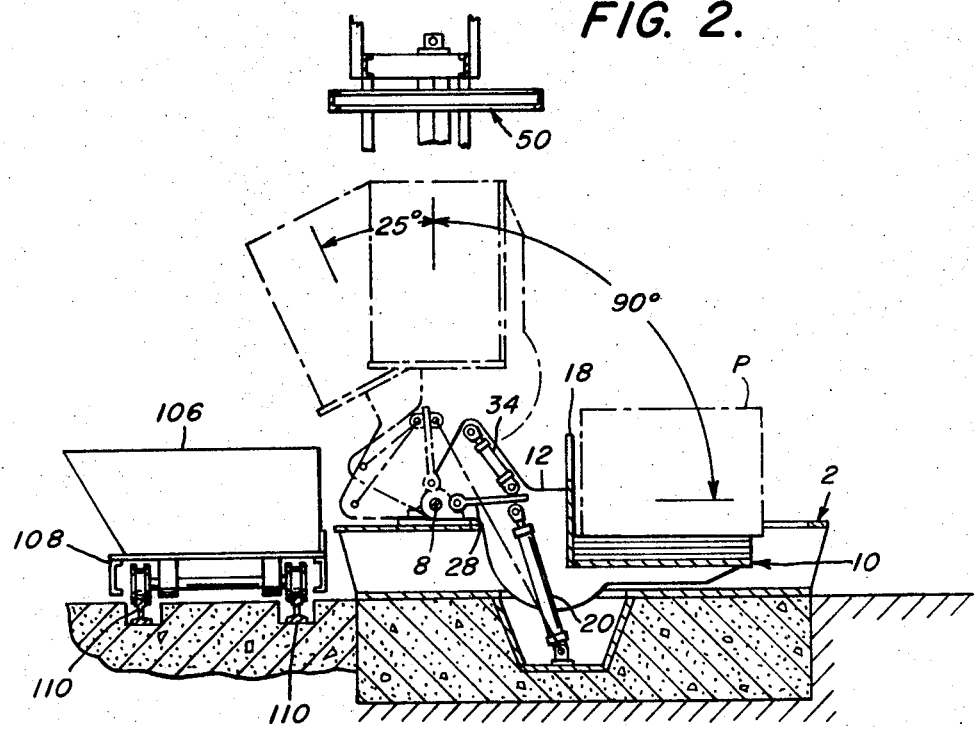
FIG. 2 is a view taken on the line II—II of FIG. 1 with some parts omitted.

The operation of our device is as follows: Assuming that the pipe P is to be cut into three segments, a torch 94 is mounted on three selected brackets 80 spaced approximately 120° apart in which position they will be aligned with the three cut out portions 19D. This is preferable when cutting relatively small diameter pipe. With large diameter pipe it is preferred to cut the pipe into four segments, in which case four torches are used and mounted on four brackets 80 spaced approximately 90° apart. In this position, the torches will be aligned with the two smaller cut out portions 19L and the two lower cut out portions 19D. The operation is the same from this point. Assuming further that the carriage 50 is in the upper position as shown and that the cradle 10 is in the full line position shown, a pipe P to be cut is rolled into the cradle onto the supports 16. Fluid is then introduced into the bottom of cylinder 20 to move the cradle 10 through 90° so that the plate 18 will be horizontal and the pipe P will be positioned with its axis vertical as shown in broken lines. The operator then causes motor 62 to rotate at a relatively fast speed to move the carriage 50 downwardly until the torches 94 on ring 52 are below the bottom of pipe P. He then starts the torches in operation and operates the motor 62 to cause the carriage 50 to move upwardly at a relative slow cutting speed. The magnets 86 cause the brackets 80 to swing toward the pipe P until the wear plates 88 contact the pipe P, thus positioning the torches 94 for best cutting operation. It will be understood that the arms 72 will be so positioned that the wear plates 88 will be spaced only a short distance from pipe P. When larger or smaller pipe are to be cut, the position of arms 72 are adjusted accordingly. When the cutting is completed the torches are shut off and the motor 62 stopped. The operator then causes fluid to be introduced into the closed or lower end of cylinder 34. This causes rotation of cradle 10 through an angle of 25° so as to move the plate 18 to a slanting position as shown in the second broken line position in FIG. 2. This discharges the individual segments into the scrap bucket 106 mounted on the scrap car 108. Fluid is then introduced into the opposite ends of cylinders 34 and 20 to restore the cradle 10 to its original position. The equipment is then ready to receive and cut another pipe P. While the operation has been described as manual, it will be understood that controls could be readily provided for automatic or semi-automatic operation.

While one embodiment of our invention has been shown and described, other adaptations and modifications may be made without departing from the scope of the following claims.

We claim:

1. Apparatus for cutting a cylindrical workpiece into a plurality of arcuate segments comprising a frame, a cradle pivotally mounted on said frame for movement about a generally horizontal axis, said cradle including a support for receiving said workpiece with its axis generally horizontal when the cradle is in a first position and a plate normal to said support at the end adjacent said frame axis, means for moving said cradle upwardly through an angle of approximately 90° to a second position whereby said workpiece rests on said plate with its axis generally vertical, means for cutting said workpiece into a plurality of segments when it is in upper position, and means for moving said cradle in the same rotational direction as in its first movement to a third position to discharge said segments from said cradle.

2. Apparatus according to claim 1 in which said first moving means includes a fluid cylinder having its closed lower end pivotally mounted on said frame, a second plate, means mounting said second plate on said cradle for movement about an axis parallel to the axis of said cradle, a piston rod movable in said fluid cylinder and having a free end pivotally connected to the outer end of said second plate, and means limiting movement of said second plate away from said cylinder; and in which said second means includes a second fluid cylinder having a closed end pivotally mounted on the outer end of said second plate, and a piston rod movable in said fluid cylinder and having a free end pivotally connected to the upper end of said cradle.

3. Apparatus according to claim 1 in which said means for cutting said workpiece includes a vertically movable carriage, at least one cutting element mounted on said carriage, and means for moving said carriage from one end of said cylinder to its other end when said cylinder is in position with its axis vertical.

4. Apparatus according to claim 3 in which said first moving means includes a fluid cylinder having its lower closed end pivotally mounted on said frame, a second plate, means mounting said second plate on said cradle for movement about an axis parallel to the axis of said cradle, a piston rod movable in said fluid cylinder and having a free end pivotally connected to the outer end of said second plate, and means limiting movement of said second plate away from said cylinder; and in which said second means includes a second fluid cylinder having its lower closed end pivotally mounted on the outer end of said second plate, and a piston rod movable in said fluid cylinder and having a free end pivotally connected to the upper end of said cradle.

5. Apparatus according to claim 1 in which said means for cutting said workpiece includes a vertically movable carriage, said carriage being generally ring shape, a pair of vertical tracks on diametrically opposite sides of said carriage arranged to support said carriage for vertical movement from one end of said cylinder to another while said cylinder is in position with its axis vertical, and a plurality of cutting elements mounted on said carriage.

6. Apparatus according to claim 5 in which said first moving means includes a fluid cylinder having its closed lower end pivotally mounted on said frame, a second plate, means mounting said second plate on said cradle for movement about an axis parallel to the axis of said cradle, a piston rod movable in said fluid cylinder and having a free end pivotally connected to the outer end of said second plate, and means limiting movement of said second plate away from said cylinder; and in which said second means includes a second fluid cylinder having its lower closed end pivotally mounted on the outer end of said second plate, and a piston rod movable in said fluid cylinder and having a free end pivotally connected to the upper end of said cradle.

7. Apparatus according to claim 5 including a pair of brackets mounted on diametrically opposite sides of said carriage, a wheel mounted on each bracket each engaging one of said tracks, a nut mounted on each bracket with its axis vertical, a vertical screw passing through each nut, and means for rotating said screws in unison to raise and lower said carriage.

8. Apparatus according to claim 7 in which said cutting elements are torches, and said apparatus including a plurality of torch supporting holders mounted on said carriage, each holder comprising a horizontal sleeve mounted on said carriage, an arm slidable in said sleeve, a bracket pivotally suspended from said arm supporting one of said torches, an inwardly facing wear plate mounted on said bracket, and a magnet mounted on said bracket beside and spaced radially outwardly from said wear plate.

9. Apparatus according to claim 8 in which said first moving means includes a fluid cylinder having its closed lower end pivotally mounted on said frame, a second plate, means mounting said second plate on said cradle for movement about an axis parallel to the axis of said cradle, a piston rod movable in said fluid cylinder and having a free end pivotally connected to the outer end of said second plate, and means limiting movement of said second plate away from said cylinder; and in which said second means includes a second fluid cylinder having its closed end pivotally mounted on the outer end of said second plate, and a piston rod movable in said fluid cylinder and having a free end pivotally connected to the upper end of said cradle.

* * * * *